J. B. AMOS.
Seed-Planter.
No. 48,145.
Patented June 13, 1865.
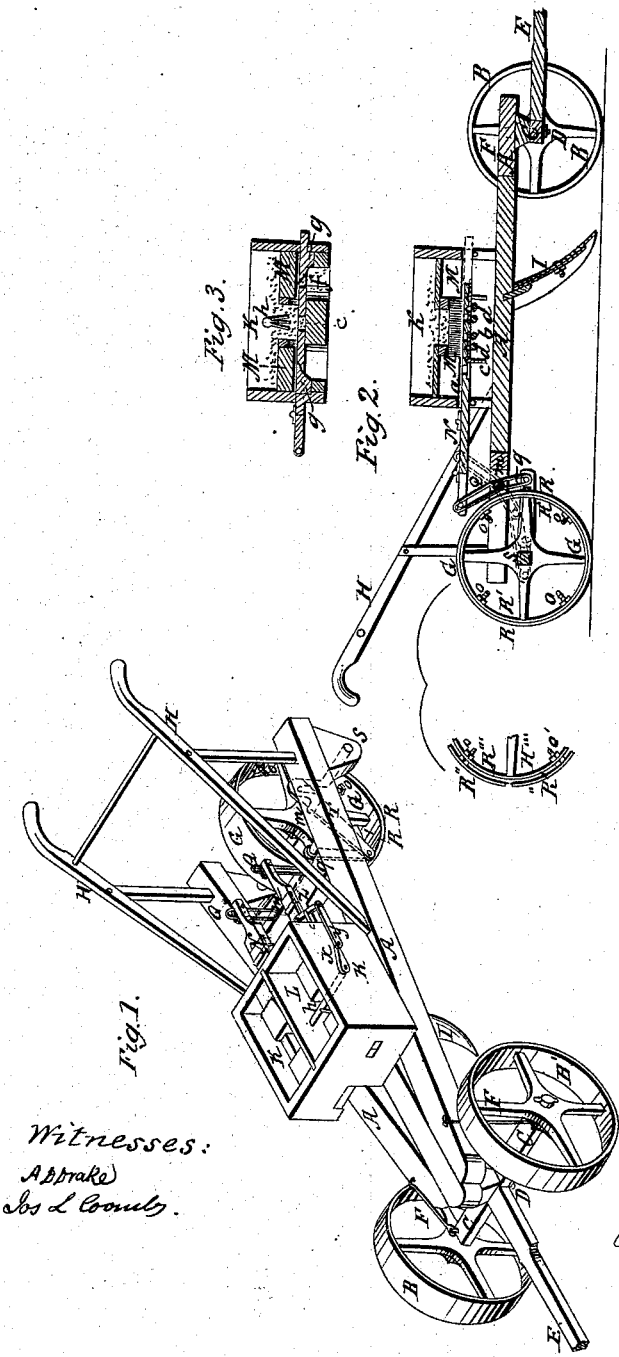

UNITED STATES PATENT OFFICE.

JAMES B. AMOS, OF LOWER CHANCEFORD, PENNSYLVANIA.

IMPROVEMENT IN GRAIN-DRILLS.

Specification forming part of Letters Patent No. 48,145, dated June 13, 1865.

*To all whom it may concern:*

Be it known that I, JAMES B. AMOS, of Lower Chanceford, in the county of York and State of Pennsylvania, have invented certain new and useful Improvements in Drills; and I hereby declare that the following is a full, clear, and exact description of the same, reference being had to the accompanying drawings, in which—

Figure 1 is a perspective view of a corn-drill with which is combined an apparatus for spreading guano or other foreign manure. Fig. 2 is a sectional elevation of the same through the corn-reservoir, and Fig. 3 a section through the guano-reservoir.

My invention relates, first, to a method of guiding the drill to the right or left, at the will of the operator, without the employment of the ordinary means, machinery, or mechanism for the purpose specially adapted; second, to a mode of constructing the valves in the guano-box so as to prevent them from being choked; third, to a means of cleaning the valves, in order to obviate their becoming clogged; fourth, to a method of regulating the distances between the hills or the time of dropping both the corn and the guano with a given space of progress.

To this effect my invention consists, first, in connecting the forward wheels, when mounted upon one and the same axle, to the truck or frame by means of a central vertical pivot, in combination with side links attached to either side of the frame or truck and to the axle next to the wheels, so as to diverge, inclining forward and downward from the truck to the axle, substantially in the manner and for the purpose hereinafter set forth; second, in forming the guano-box with a recessed bottom, so as to expose the valves, in combination with valves consisting of a reciprocating bar with measuring cups or apertures, under the arrangement substantially as hereinafter set forth; third, in the combination, with the cup slide-valves, of stationary cleaning-blades penetrating a longitudinal slot in the valve-bar traversing the cups; fourth, in the combination, with the driving-wheel operating the slide-valves, of the means herein described of enlarging or diminishing the diameter of the said wheel, in the manner and for the purpose hereinafter set forth.

In the accompanying drawings, A is the frame of the drill, consisting of two horizontal timbers converging toward the front and laterally braced in the rear. The forward end is supported by means of two wheels, B B', which are mounted upon an axle, C, pivoted to the frame by means of a vertical bolt, D, so as to freely oscillate on said bolt or central pivot To guide this vehicle it would be necessary to connect with the axle a tongue, E, or shafts, and the service of an attendant would be required in order to shift the wheels to the right or left, as the case may be. To dispense with this I link the axle to the forward end of the truck by means of iron rods F, the eye at each end of which is secured in staples fast in the truck and the axle, respectively, the links occupying a position inclined downward and forward at each side of the truck. The rear of the truck is supported by a wheel, G, which occupies a central position in relation to the truck and the front wheels, and handles H are secured on top the frame, so that on depressing either handle the front wheel on the side which is depressed will be thrown in advance of its mate by the link acting as a brace to the axle on the side which is depressed. In this manner, by canting the drill to the right or left the forward wheels will shift on the pivot and impart to the truck a curvilinear motion under the propelling action of the operator.

To the frame or truck is secured so as to project from below, between, and in rear of the guiding-wheels, but in advance of the driving-wheel, a shovel-plow, I, for throwing up the soil and forming the hills. Immediately above and midway between the front wheel and the driving-wheel is the corn and grain reservoir K. This consists of a box divided centrally by a partition, L. One side of the partition is destined to contain the corn to be planted, the other the guano or phosphate or other powdered manure. The former has a bottom recessed in the center, the opening being provided with bristles or brushes M to clean the surface of the valve-bar. The corn contained in the box, falling through the recessed portion, drops upon a valve-bar, N, *i.e.*,—a sliding board provided with two holes which are closed and opened automatically by means of flaps $c\ c'$, hinged to the under side—traveling over stationary rods $d$, secured in the box and immediately underneath and in line with the slide-valve. In the position indicated in Fig. 2, the slide-valve being drawn back, the flap c is open, allowing the grain in the hole a to drop out, while flap c remains closed by the action of the rods d, and thus holding the grain in the hole b until the slide-valve is brought into position. (Shown in red lines.) The guano-box is also recessed to allow easy access to the valves. Around the recessed portion there are brushes or bristles M' to clean the surface of the valve-bar at each stroke.

The valve proper is composed of a board in which measuring cups or apertures e and f are provided, which at each stroke become charged with guano from the box. To clean the cups the board containing them is slotted in the line of travel, and stationary blades g are arranged which penetrate the slots, and thus prevent them from becoming clogged or obstructed.

The guano-box may be provided with a stirrer, h, to keep the manure properly mixed and pulverized before allowed to drop into the cup. This stirrer (shown in Figs. 1 and 3) is mounted on a horizontal shaft, whose external crank x, being connected by means of a connecting-rod, y, with the rocker z, which, in its turn, is actuated by the slide-valves. The valves are operated by slotted levers Q, mounted on a rock-shaft, m, which is moved by a lever, q, receiving motion from the main driving-wheel G by means of a crank and shaft, s, and connecting-rod r.

To regulate the distances between the hills, I arrange the driving-wheel so as to allow of the enlargement or diminishing of its diameter. For this purpose the outer rim, R, is made in sections, which are held in place on an inner rim, R', by means of nuts o on screw-threaded shanks fast on the outer rim and traversing holes in the inner rim. By turning the nuts to the right or left the outer rim will be expanded or contracted and the diameter of the wheel increased or diminished, causing more or less distance of ground to be traveled by the wheel for each stroke.

To maintain the adjustment any available means or devices may be employed. I would suggest the insertion between the inner rim and the outer movable rim sections of wooden wedges; or an auxiliary nut may be used on the screw-shank between the two rims, as shown at R'' and R'''.

Having thus described my invention and the manner in which the same is or may be carried into effect, I claim—

1. Connecting the forward wheels, when mounted upon one and the same axle, to the truck or frame by means of a central vertical pin, in combination with side links attached to either side of the frame or truck and to the axle next to the wheels, so as to diverge, inclining forward and downward from the truck to the axle, substantially in the manner and for the purpose set forth.

2. In combination with the cup slide-valves, stationary cleaning-blades penetrating a longitudinal slot in the valve-bar traversing the cups, substantially as set forth.

3. In combination with the operating slide-valves, the means herein described of enlarging or diminishing the diameter of the said wheel, in the manner and for the purpose herein set forth.

In testimony whereof I have signed my name to this specification before two subscribing witnesses.

JAMES B. AMOS.

Witnesses:
HUGH TARBERT,
ELENOR C. TARBERT.